(12) United States Patent
Kameya et al.

(10) Patent No.: US 6,987,852 B2
(45) Date of Patent: Jan. 17, 2006

(54) MODULAR JACK (75) Inventors: Takehiko Kameya, Tokyo (JP); Hideo Miwa, Tokyo (JP); Akio Suzuki, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 483 days.

(21) Appl. No.: 10/026,766

(22) Filed: Dec. 27, 2001

(65) Prior Publication Data

US 2002/0146114 A1 Oct. 10, 2002

(30) Foreign Application Priority Data

Apr. 10, 2001 (JP) .................................... 2001-111339

(51) Int. Cl.
*H04M 1/00* (2006.01)

(52) U.S. Cl. .................................... 379/438

(58) Field of Classification Search ............. 379/438, 379/433.05; 439/296, 630, 676
See application file for complete search history.

(56) References Cited

U.S. PATENT DOCUMENTS 6,350,156 B1 * 2/2002 Hasircoglu et al. ......... 439/676

FOREIGN PATENT DOCUMENTS

JP 6-3750 1/1994
JP 10-187896 7/1998

* cited by examiner

*Primary Examiner*—Jack Chiang
(74) *Attorney, Agent, or Firm*—Takeuchi & Kubotera, LLP (57) ABSTRACT A modular jack (31) comprises a housing (32) and a foolproof mechanism (34) including a pair of spring members (42) cantilevered to the housing (32), and an abutment section (43) provided at the front end of each spring member (42). Each abutment section (43) consists of a cam portion (45) having an inclined face (47) and a stopper portion (44) provided behind and inside the cam portion (45). When a modular plug (2) having a predetermined number of poles is inserted into the modular jack (31), the front ends of the modular plug (2) abut the inclined faces (47) of the cam portions (45) to move the abutment sections (43) outwardly, permitting insertion of the modular plug (2). When a modular plug (2') having a number of poles that is smaller than the predetermined number is inserted, the front ends of the modular plug (2') abut against the stopper portions (44) to block insertion of the modular plug (2').

13 Claims, 11 Drawing Sheets

MODULAR JACK

BACKGROUND OF THE INVENTION

1. Field of the Invention

The present invention relates to modular jacks and, particularly, to a modular jack equipped with a foolproof mechanism for preventing insertion of a modular plug having a number of terminals that is not a predetermined number.

2. Description of the Related Art

Modular jacks and plugs for use in telephone equipment or local area network (LAN) are well known. There are six-pole or eight-pole type modular jacks and plugs according to the number of terminals installed. The arranging pitch of the terminals are the same for both the types so that a six-pole type modular plug can be plugged by mistake into an eight-pole type modular jack, causing an electrical malfunction. Japanese patent application Kokoku No. 6-3750 proposed a modular jack equipped with a mechanism to prevent plugging any plug having a different pole number.

FIGS. 14–18 show an eight-pole modular jack 1 as disclosed in the above Japanese patent specification. This eight-pole modular jack 1 receives such an eight-pole modular plug 2 as shown in FIG. 19.

Figure 14:
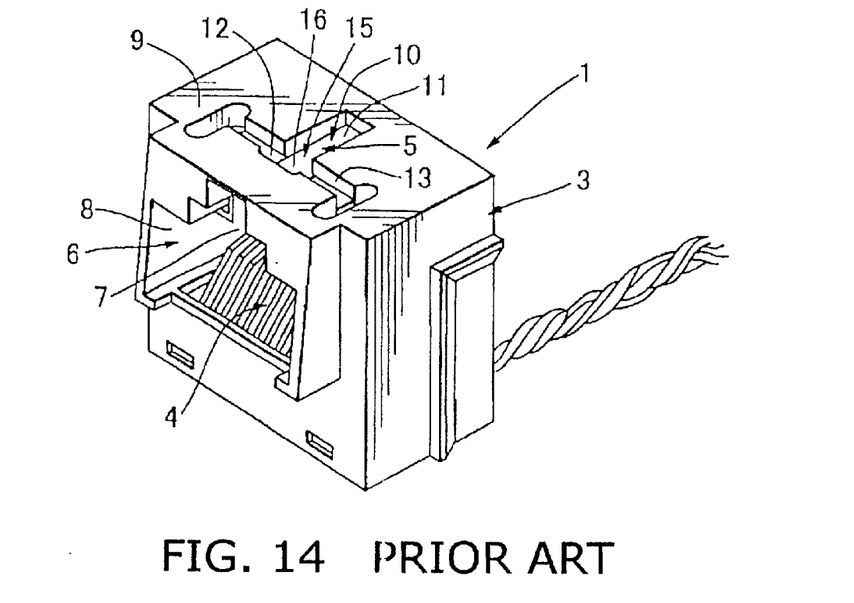
FIG. 14 is a perspective view of a conventional modular jack.
Figure 15:
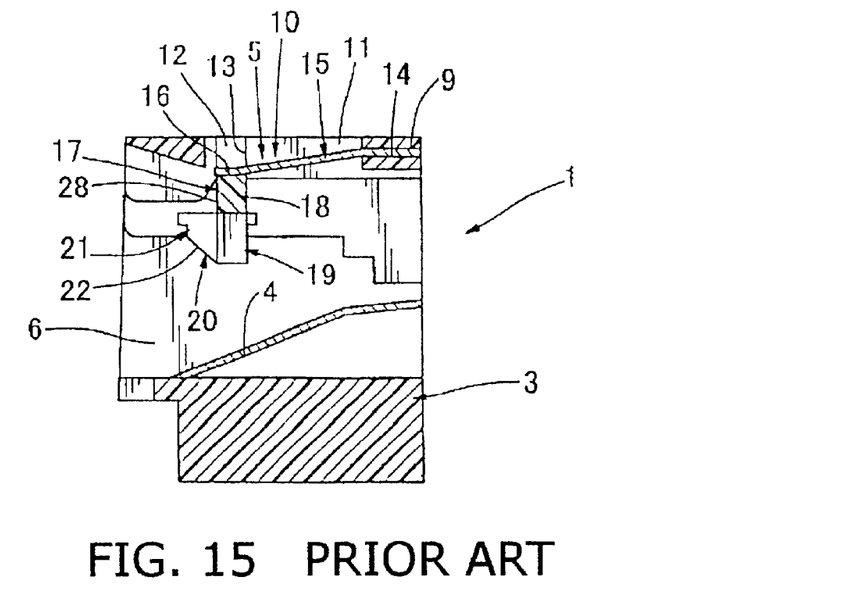
FIG. 15 is a sectional view of the conventional modular jack.

In FIGS. 14 and 15, the modular jack 1 comprises a housing 3, eight terminals 4 arranged side by side within the housing 3, and a foolproof mechanism 5 provided in the top of the housing 3. A plug cavity 6 extends rearwardly from the front face of the housing 3 and has a central section 7 that is higher than side sections 8. A slot 10 is provided in a top wall 9 and has a trunk section 11 extending along the central section 7 of the plug cavity 6 and a pair of branch sections 12 extending outwardly from the front portion of said trunk section 11. Also, it has a pair of guiding slots 13 extending downwardly from the top of the housing 3 above the side sections 8 of the plug cavity 6.

Figure 16:
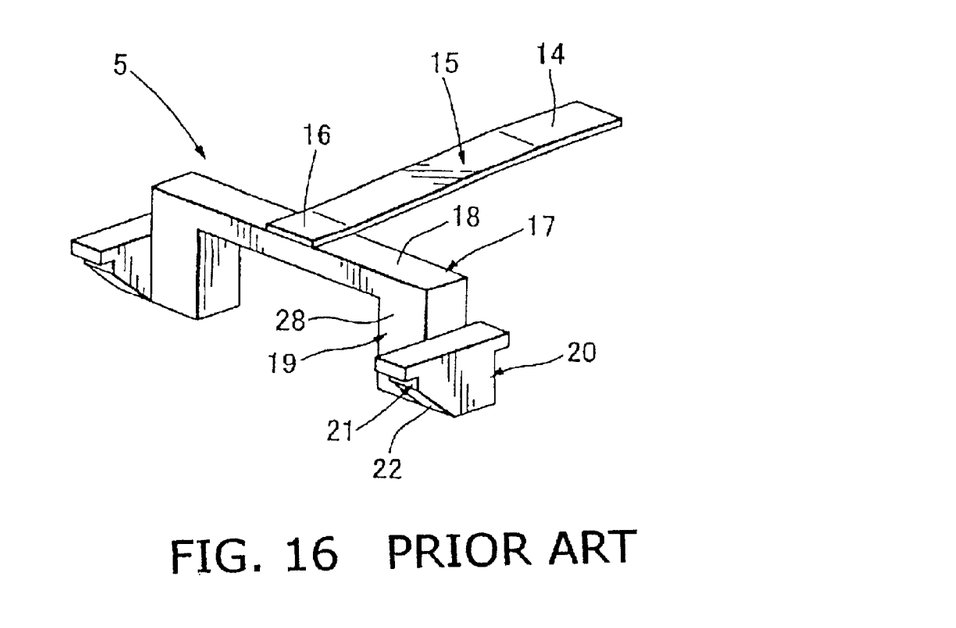
FIG. 16 is a perspective view of a conventional foolproof mechanism.
Figure 17:
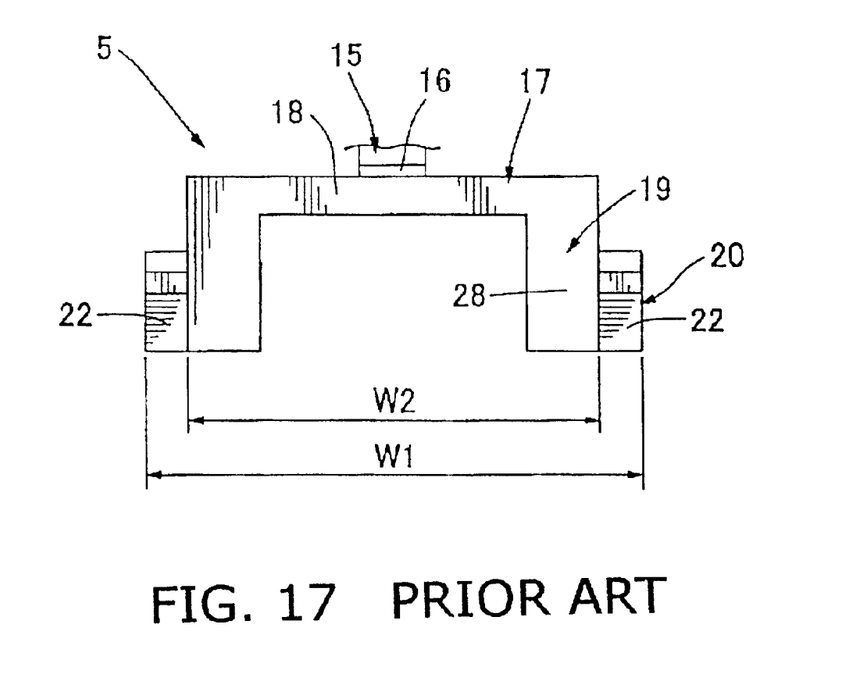
FIGS. 17 and 18 are front and side views of the conventional foolproof mechanism, respectively.
Figure 18:
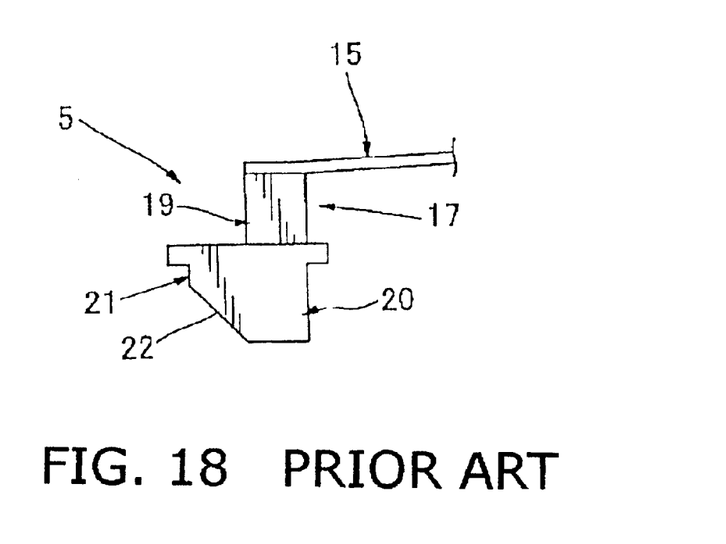

In FIGS. 16–18, the foolproof mechanism 5 is cantilevered by the housing 3 at a rear portion 14 thereof and comprises a leaf spring 15 fitted in the trunk section 11 for vertical movement and a stopper-equipped cam member 17 fixed to the front portion of the leaf spring 15 fitted in the branch sections 12 for vertical movement. The stopper-equipped cam member 17 has a traverse arm section 18 with the central portion fixed to the front portion 16 of the leaf spring 15, a pair of stopper sections 19 extending downwardly from opposite ends of the arm section 18, and a pair of cam sections 20 provided on the outside of each stopper section 19. The leaf spring 15 is vertically flexible in the slot 10 so that the stopper-equipped cam member 17 is vertically movable along the guiding slots 13 with the rear portion 14 as a fulcrum. Each cam section 20 has a front portion 21 projecting forwardly beyond the stopper section 19 and a tapered face 22 extending rearwardly from the front portion 21. The outside width W1 (FIG. 17) of the cam sections 20 is substantially equal to the width of the eight-pole modular plug 2 and the inside width W2 of the cam sections 20 is made slightly larger than the six-pole modular plug 2' in FIG. 20.

Figure 19:
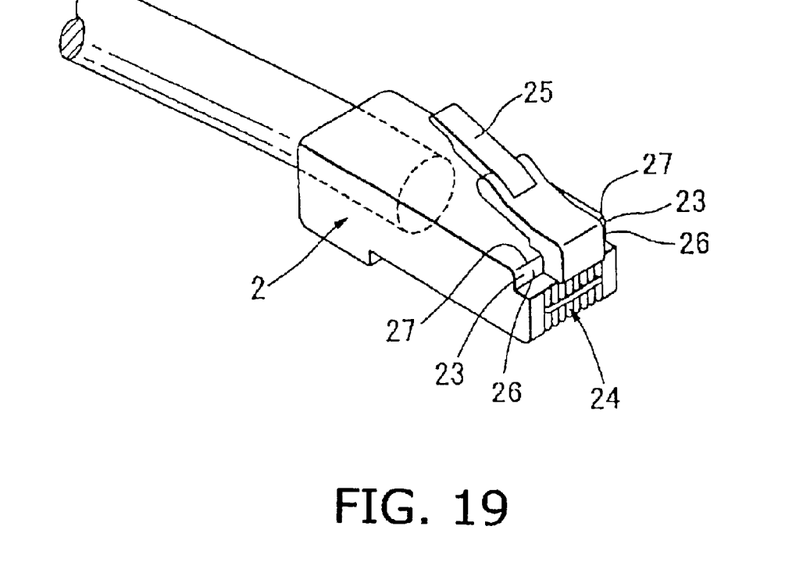
FIGS. 19 and 20 are perspective views of eight-pole and six-pole modular plugs, respectively.

As shown in FIG. 19, the modular plug 2 has eight terminals 24 and a lock member 25 extending rearwardly from the front end. A pair of front ends 23 and a pair of vertical faces 26 are provided on opposite sides of the lock member 25.

When the eight-pole modular plug 2 is inserted into the eight-pole modular jack 1, the upper edges 27 of the front ends 23 abut and slide on the tapered faces 22 of the cam sections 20 while exerting upward forces on the cam sections 20. Consequently, the leaf spring 15 is flexed upwardly and the stopper-equipped cam member 17 is pushed up along the guiding slots 13 so that the eight-pole modular plug 2 can be inserted in the eight-pole modular jack 1.

Figure 20:
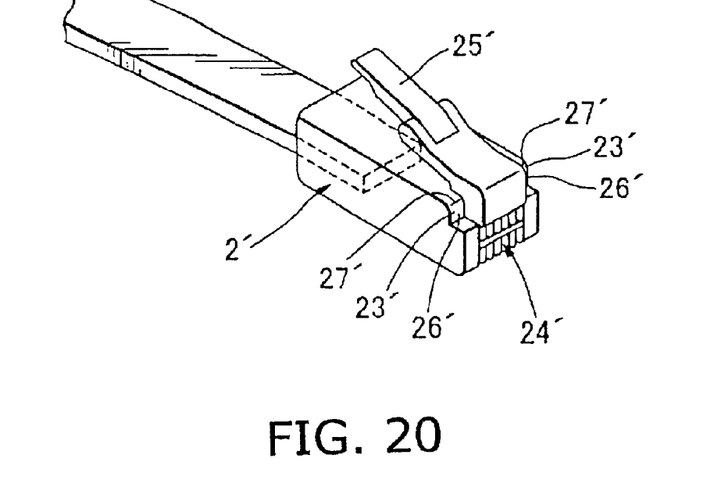

As shown in FIG. 20, the modular plug 2' has six terminals 24' and a lock member 25' extending rearwardly from the front end. A pair of front ends 23' and a pair of vertical faces 26' are provided on opposite sides of the lock member 25'.

When the six-pole modular plug 2' is inserted into the eight-pole modular jack 1, the vertical faces 26' of the modular plug 2' abut against the front faces 28 of the stopper sections 19 to prevent further insertion of the modular plug 2'. Accordingly, the six-pole modular plug 2' cannot be inserted into the eight-pole modular jack 1.

However, the leaf spring 15 is provided above the central section 7 of the plug cavity 6 and the stopper sections 19 extend downwardly from the arm section 18 so it is difficult to reduce the height of the modular jack 1. The leaf spring 15 and the stopper-equipped cam member 17 are separate components, keeping the number of components and the manufacturing cost high. The foolproof mechanism 5 is fitted in the slot 10 for vertical movement and the leaf spring 15 is flexible so that an accidental force can break the leaf spring.

SUMMARY OF THE INVENTION

Accordingly, it is an object of the invention to provide a modular jack enabling to reduce the height and the manufacturing cost and prevent the break by an accidental force.

According to the invention there is provided a modular jack equipped with a foolproof mechanism for preventing insertion of a modular plug having a number of poles that is not a predetermined number. The foolproof mechanism comprises a pair of spring members each having an abutment section provided at a front end thereof. The abutment section has a cam portion made of an inclined face and a stopper portion located behind and inside the cam portion such that when a modular plug having the predetermined number of poles is inserted into the modular jack, a front end of the modular plug abuts on the inclined face of the cam portion to move the abutment section outwardly, permitting insertion of the modular plug into the modular jack but when another modular plug having a number of poles that is smaller than the predetermined number is inserted, a front end of the another modular plug abuts against the stopper portion to prevent insertion of the another modular plug.

The spring member and the abutment section may be made as a unit. The spring members may be provided along an outside of the housing. The spring members are provided opposite sides of a top wall of the housing. The modular jack may further comprises a pair of slots provided in the housing into which the abutment sections are fitted for sliding movement along rear faces of the slots and a shield plate over the housing from which the foolproof mechanism extends.

DESCRIPTION OF THE PREFERRED EMBODIMENTS

In FIGS. 1–6, an eight-pole modular jack 31 comprises a rectangular housing 32 made of an insulative material, eight terminals 33 provided in the modular jack 31, and a foolproof mechanism 34 provided on the upper portion of the housing 32. A cable 59 is connected to the terminals 33. A plug cavity 35 extends rearwardly from the front face of the housing 32 and has a central section 36 and a pair of side sections 37 that are shorter than the central section 36. A pair of horizontal grooves 38 are provided in opposite sides of a top wall 58 of the housing 32. A pair of vertical slots 39 communicate the front ends of the horizontal grooves 38 and a pair of side sections 37 of the plug cavity 35.

The foolproof mechanism 34 comprises a pair of metal strips each bent to provide a fixing section 40 to be press-fitted in the horizontal groove 38, a spring section 42 extending along the bottom of the horizontal groove 38, and an abutment section 43 extending forwardly from the spring section 42. The abutment section 43 is divided into a stopper portion 44 and a cam portion 45 that is located on the outer side of the stopper portion 44. The stopper portion 44 extends downwardly along the rear face 46 of the slot 39. The cam portion 45 extends downwardly along the rear face 46 and obliquely upwardly to form an inclined face 47. The width W1 (FIG. 1) between the outsides of the cam portions 45 is substantially equal to the width of the eight-pole modular plug 2 of FIG. 19, and the width W2 (FIG. 1) between the insides of the cam portions 45 is slightly larger than the width of the six-pole modular plug 2' of FIG. 20.

The operation of the eight-pole modular jack 31 will be described with reference to FIGS. 7 and 8.

Figure 1:
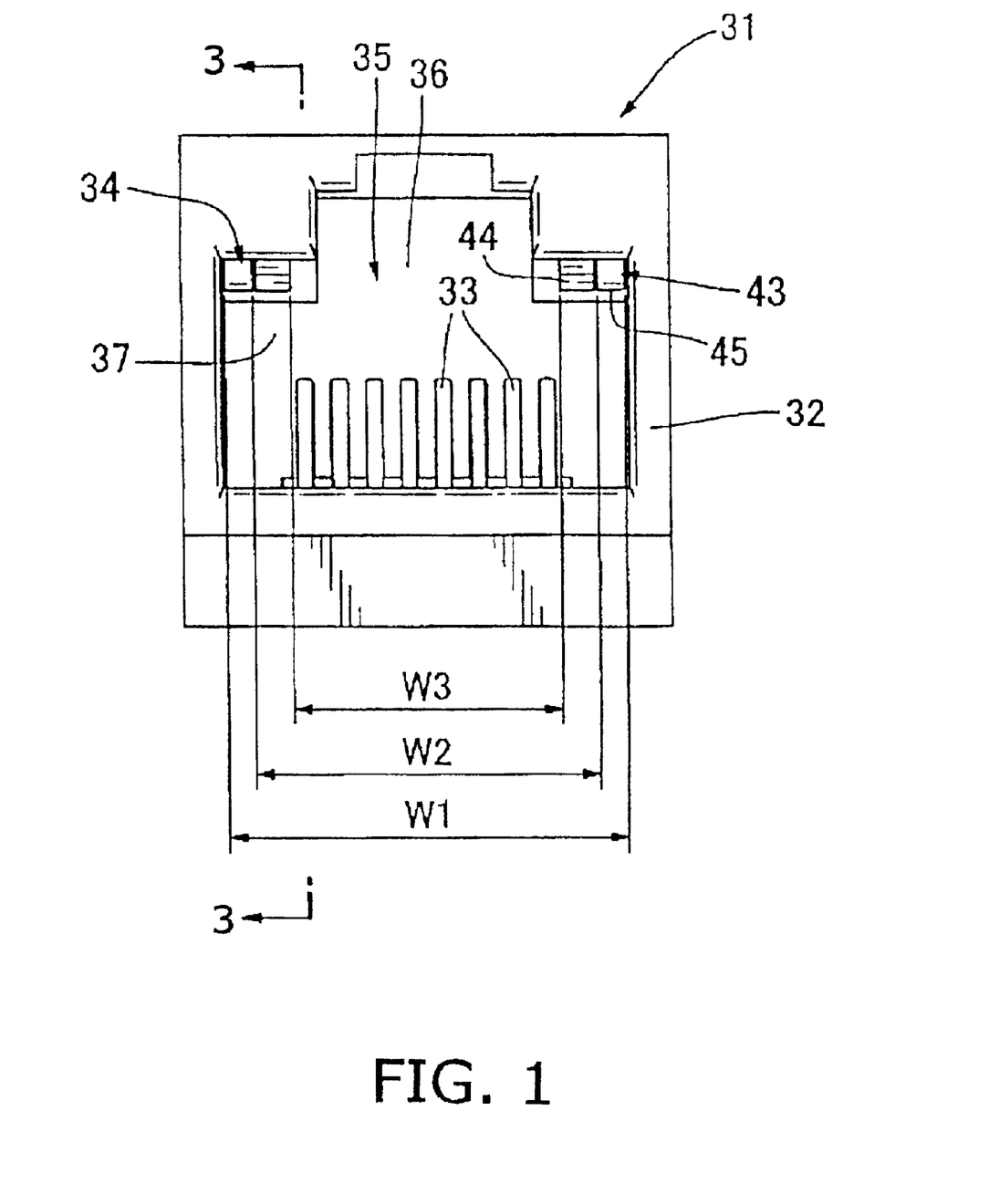
FIG. 1 is a front view of a modular jack according to an embodiment of the invention.
Figure 2:
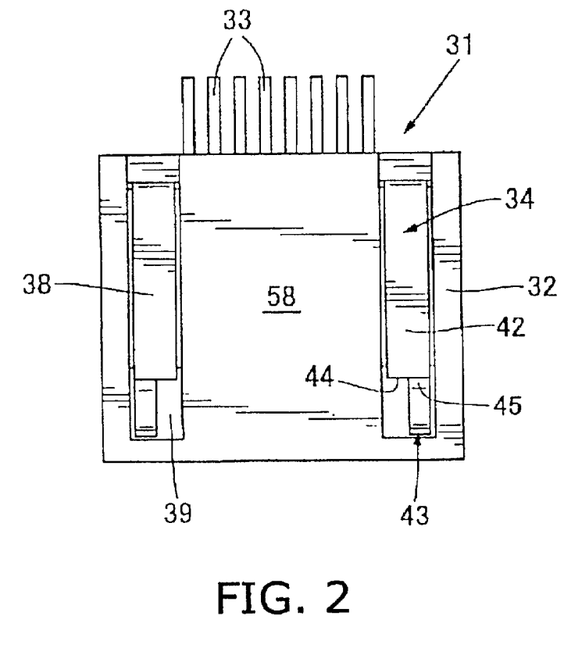
FIG. 2 is a top view of the modular jack.
Figure 3:
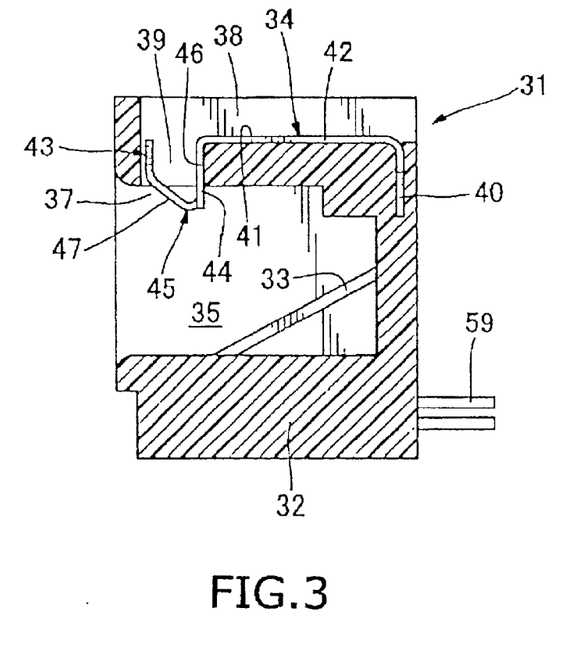
FIG. 3 is a sectional view taken along line 3—3 of FIG. 1.
Figure 4:
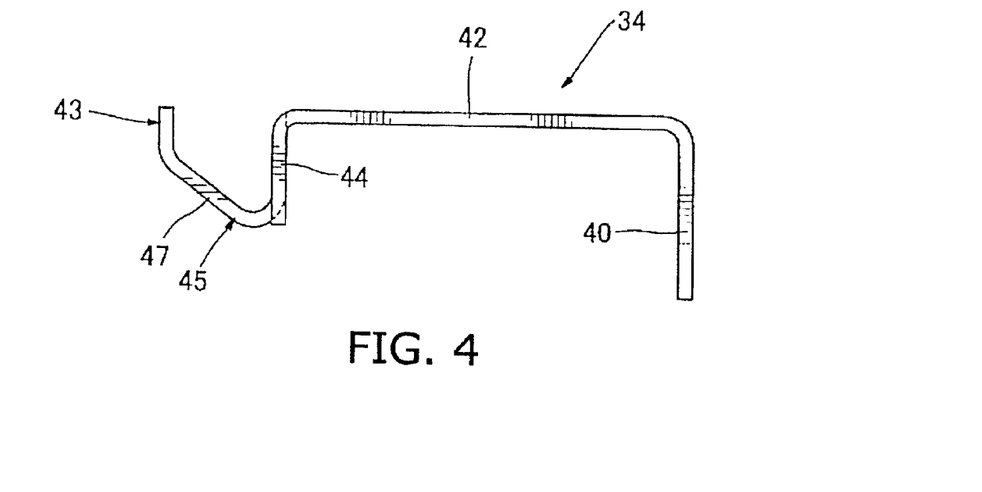
FIG. 4 is a side view of a foolproof mechanism according to the embodiment.
Figure 5:
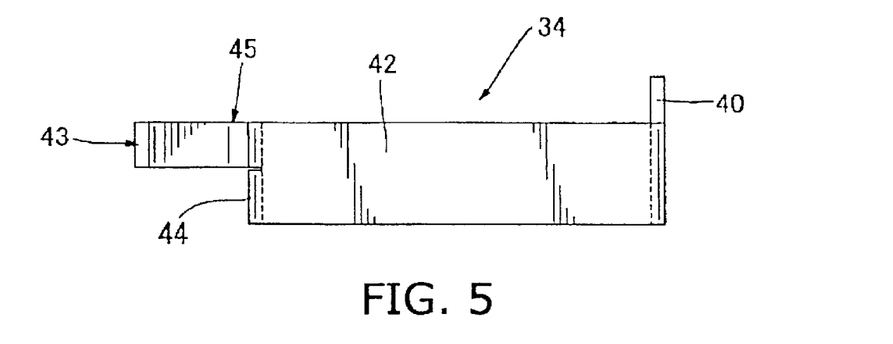
FIG. 5 is a top view of the foolproof mechanism.
Figure 6:
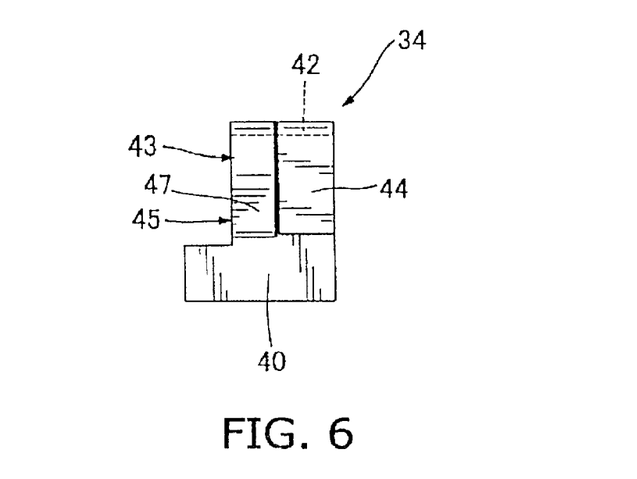
FIG. 6 is a front view of the foolproof mechanism.
Figure 7A:
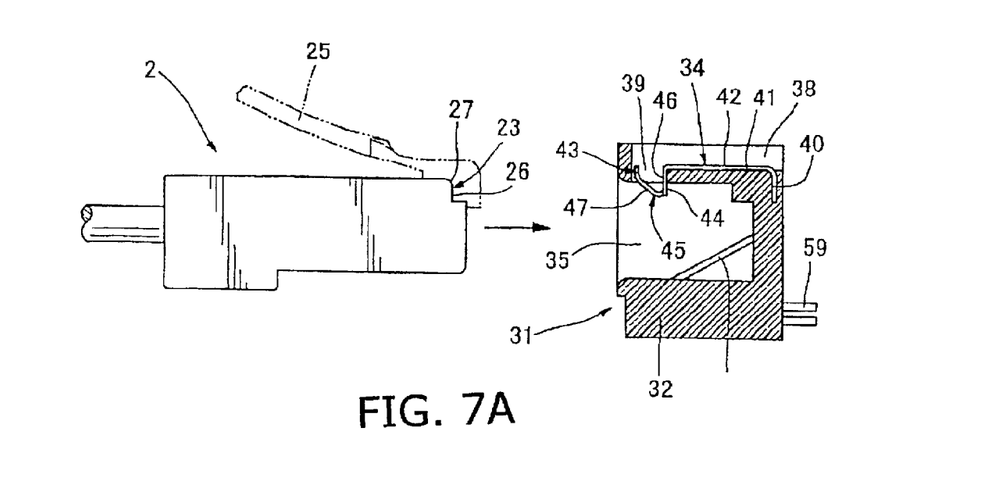
FIGS. 7A–7C are sectional views of the modular jack with an eight-pole modular plug.
Figure 7B:
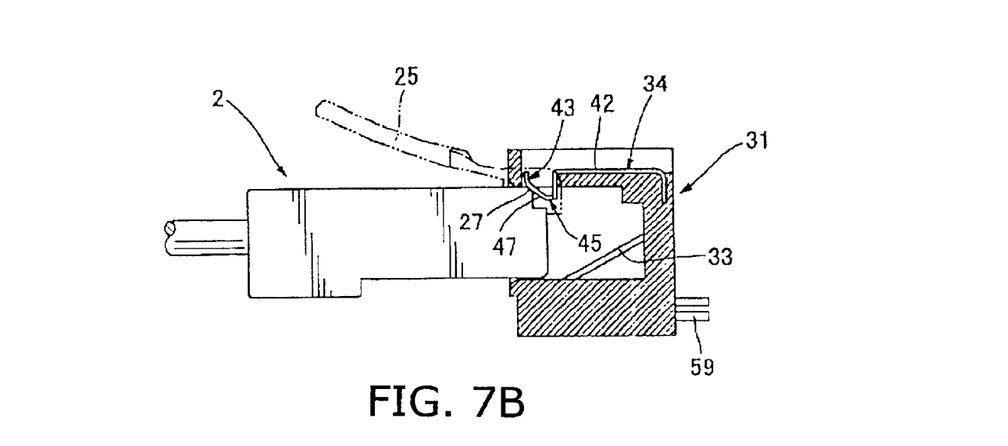

In FIGS. 7A and 7B, when the eight-pole modular plug 2 is inserted into the eight-pole modular jack 31, the upper edges 27 at the front ends 23 of the modular plug 2 abut and slide on the inclined faces 47 of the cam portions 45 for pushing them up.

Figure 7C:
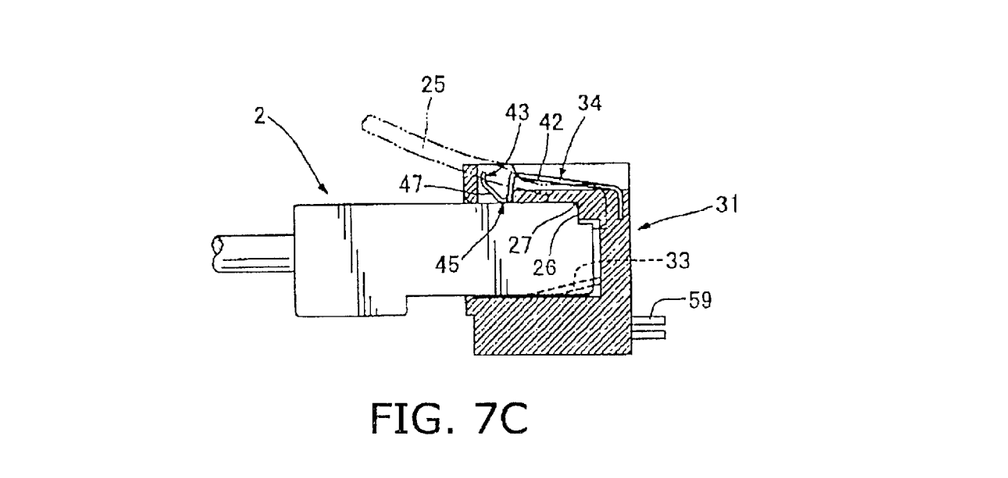

In FIG. 7C, the spring portion 42 is flexed and the abutment portions 43 are pushed upwardly along the rear faces 46 of the slots 39 so that the eight-pole modular plug 2 is inserted in the eight-pole modular jack 31 bringing the terminals (not shown) of the modular plug 2 into electrical contact with the terminals 33 of the modular jack 31.

Figure 8A:
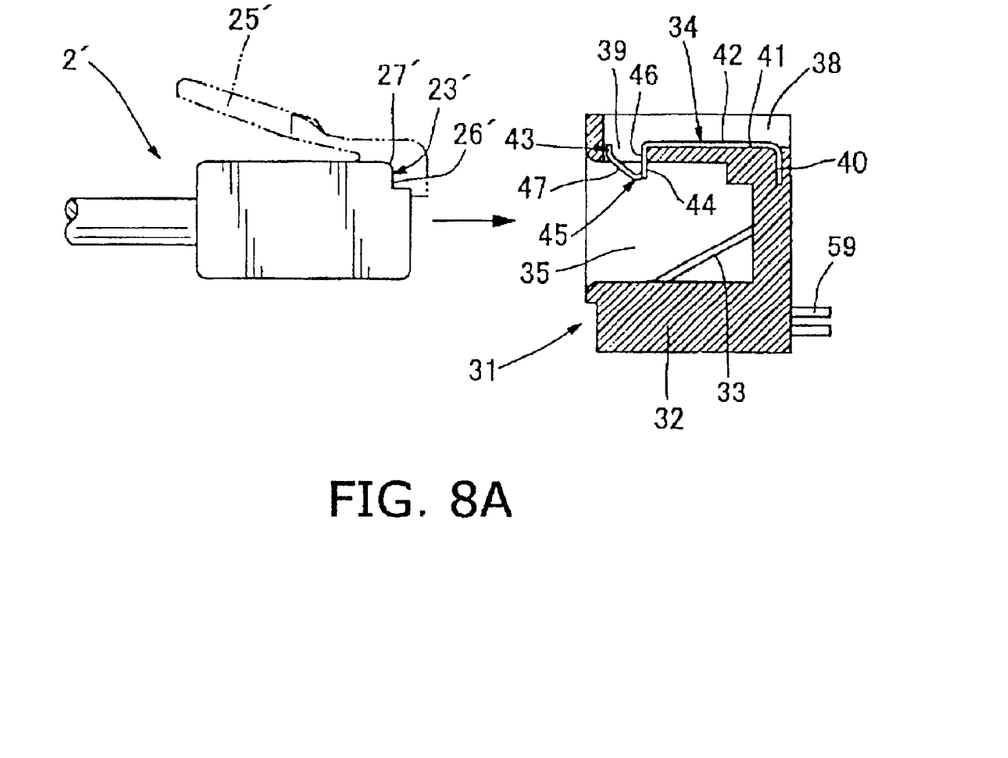
FIGS. 8A and 8B are sectional views of the modular jack with a six-pole modular plug.
Figure 8B:
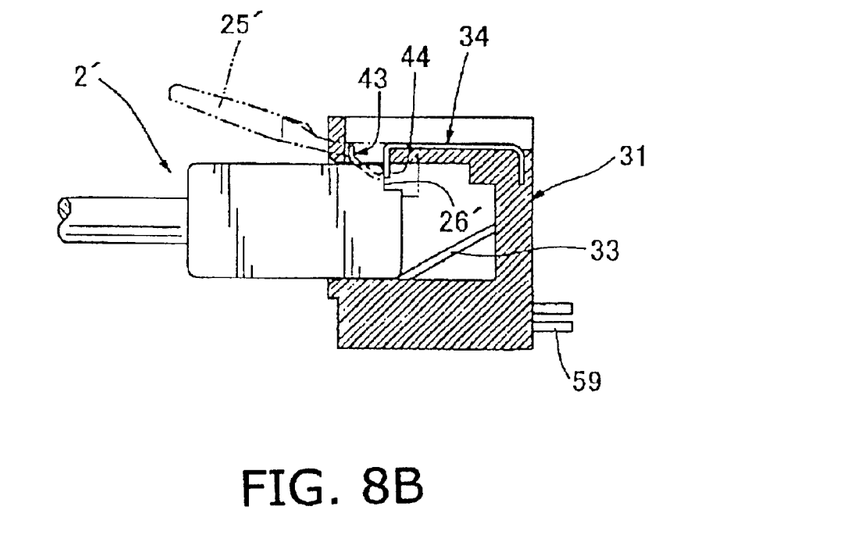

In FIGS. 8A and 8B, when the six-pole modular plug 2' is inserted into the eight-pole modular jack 31, the vertical end faces 26' of the modular plug 2' abut against the stopper portions 44 so that the modular plug 2' is prevented from further advancement. Thus, the six-pole modular plug 2' is not plugged into the eight-pole modular jack 31 so that the terminals of the modular plug 2' are not brought into electrical contact with the terminals 33 of the modular jack 31.

Figure 9:
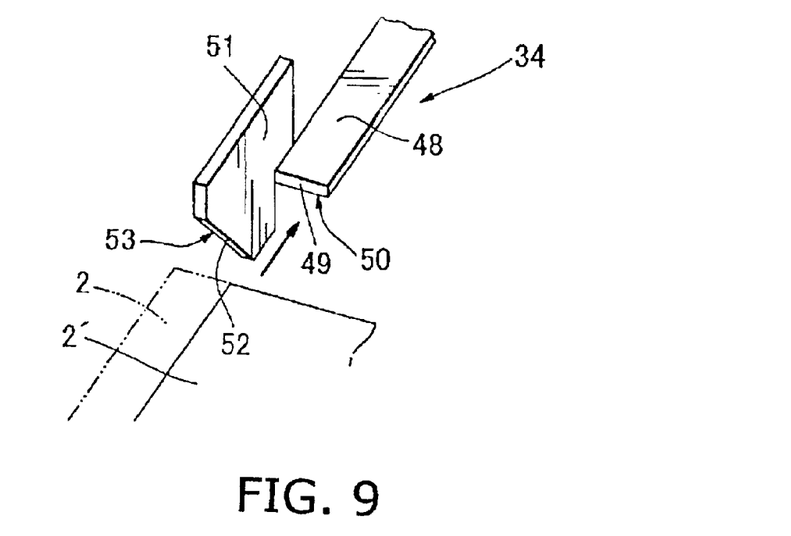
FIG. 9 is a perspective view of a foolproof mechanism according to another embodiment of the invention.

In FIG. 9, a foolproof mechanism 34 according to another embodiment comprises a horizontal metal plate 48 having a front end 49 working as a stopper portion 50 and a vertical metal plate 51 having an inclined face 52 working as a cam portion 53.

Figure 10:
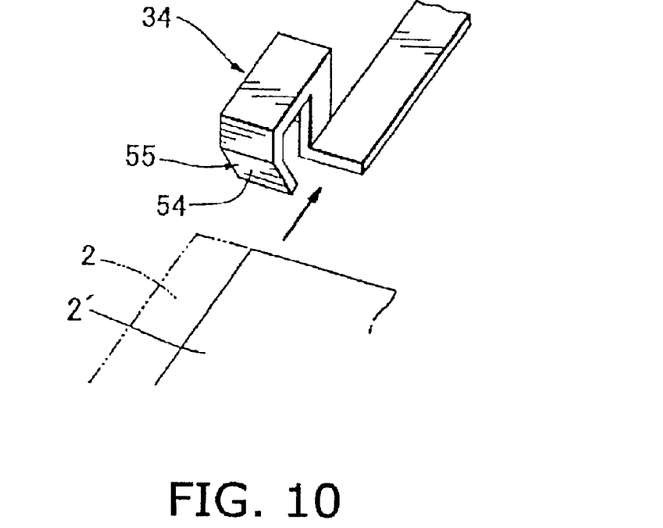
FIG. 10 is a perspective view of a foolproof mechanism according to still another embodiment of the invention.

In FIG. 10, a foolproof mechanism 34 according to still another embodiment comprises a metal plate having a front portion bent downwardly to form an inclined face 54 working as a cam portion 55.

Figure 11:
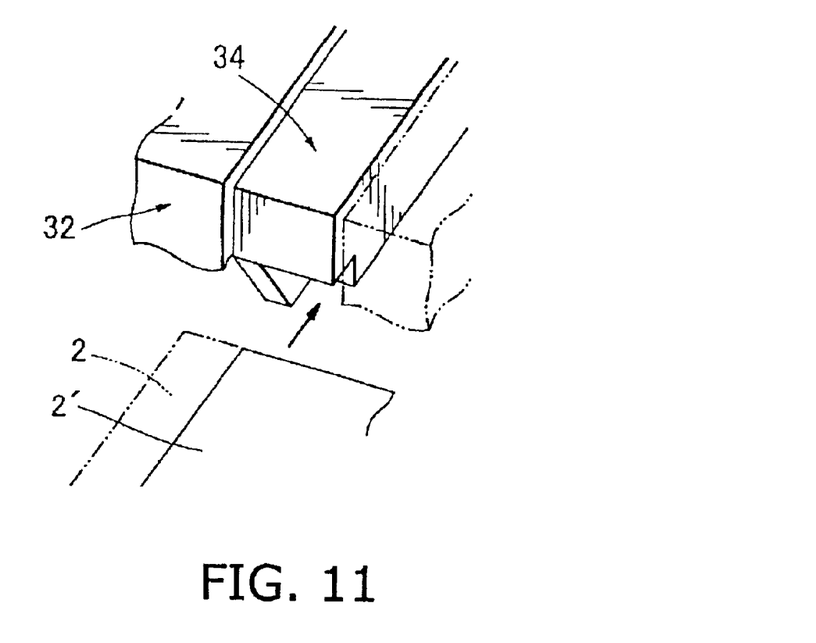
FIG. 11 is a perspective view of a foolproof mechanism according to yet another embodiment of the invention.

In FIG. 11, a foolproof mechanism 34 according to yet another embodiment is incorporated in the housing 32 as a unit for vertical movement.

Figure 12:
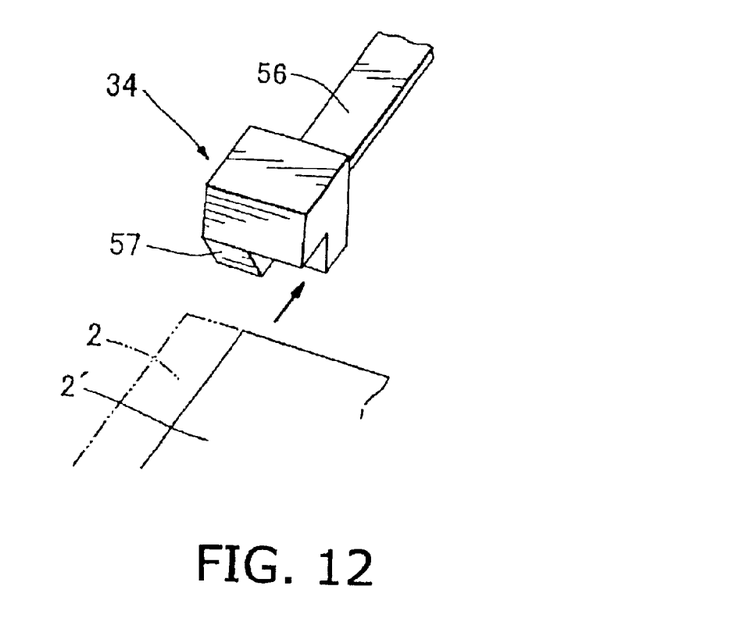
FIG. 12 is a perspective view of a foolproof mechanism according to another embodiment of the invention.

In FIG. 12, a foolproof mechanism 34 according to another embodiment comprises a spring member 56 made of a metal plate and an abutment member 57 made of a resin.

Alternatively, each of the inclined faces 47, 52, and 54 may be a curved face.

Figure 13:
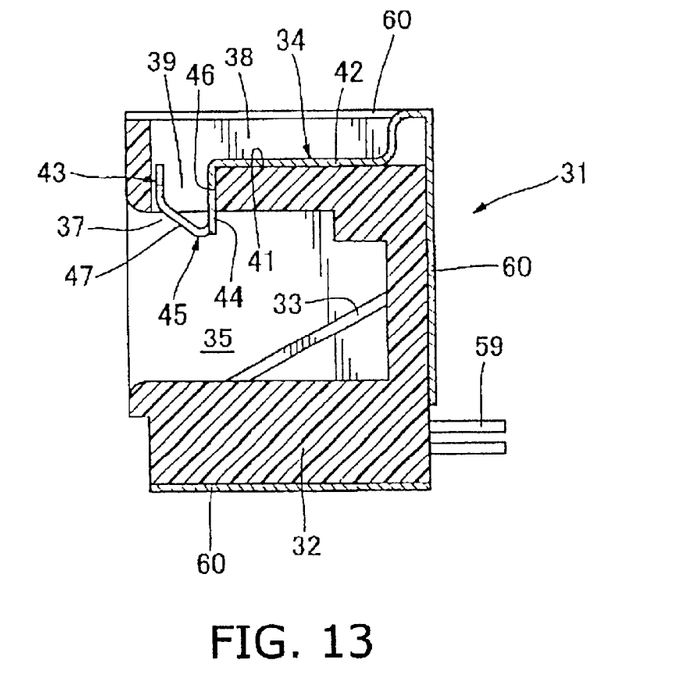
FIG. 13 is a sectional view of a modular jack with a foolproof mechanism according to still another embodiment of the invention.

In FIG. 13, a shield plate 60 is provided over the housing 32. A foolproof mechanism 34 extends forwardly from the shield plate 60 as a unit. A separate foolproof mechanism 34 may be fixed to the shield plate 60.

By making the width W3 (FIG. 1) between the insides of the stopper portions 44 larger than the width of a four-pole modular plug, it is possible to prevent insertion of the four-pole modular plug into the eight-pole modular jack 31. The eight-pole modular jack 31 may be replaced by a six-pole modular jack and so on. The abutment portions of the foolproof mechanism may be made such that they are moved outwardly, instead of upwardly, when the eight-pole modular plug 2 is inserted into the eight-pole modular jack 31.

As has been described above, according to the invention, the abutment portions are provided at the front ends of spring members so that the height of the connector is reduced. Where the spring sections are provided along opposite sides of the top wall of the housing, it is possible to provide the abutment portions at opposite sides of the plug cavity, further reducing the height of the connector.

By making the spring section and the abutment portion as a unit, it is possible to reduce the number of components and the manufacturing cost. By providing the spring sections along the outside of the housing, it is possible to control the downward flexure of the spring sections, preventing breakage of the spring sections. By providing the modular jack housing with slots such that the abutment portions slide along the rear faces of the slots, it is possible to facilitate movement of the foolproof mechanism.

What is claimed is:

1. A modular jack comprising a housing with a top wall having a pair of grooves provided on opposite sides thereof and equipped with a foolproof mechanism for preventing insertion of a modular plug having a number of poles that is not a predetermined number, said foolproof mechanism comprising:

a pair of spring members each having an elongated spring section provided in said groove, a fixing section provided at a rear end thereof and secured to said housing so that said elongated spring section is upwardly flexible, and an abutment section provided at a front end thereof, said abutment section having:

a cam portion extending first downwardly and then diagonally upwardly from said front end, forming made of an inclined face and a stopper portion extending downwardly directly from said front end and located behind and inside said cam portion such that when a modular plug having said predetermined number of poles is inserted into said modular jack, a front end of said modular plug abuts on said inclined face of said cam portion to move said abutment section outwardly, permitting insertion of said modular plug into said modular jack but when another modular plug having a number of poles that is smaller than said predetermined number is inserted, a front end of said another modular plug abuts against said stopper portion to prevent insertion of said another modular plug.

2. The modular jack according to claim 1, wherein said spring member and said abutment section are made as a unit.

3. The modular jack according to claim 1, wherein said spring members are provided along an outside of said housing.

4. The modular jack according to claim 1 or 2, which further comprises a pair of slots provided in said housing into which said abutment sections are fitted for sliding movement along rear faces of said slots.

5. The modular jack according to claim 1 or 2, which further comprises a shield plate over said housing from which said foolproof mechanism extends.

6. A modular jack comprising:

a housing having a wall with a pair of grooves provided on opposite sides thereof and a plug cavity with a central section and a pair of side sections, said central section extending closer to said wall than said side sections, and a foolproof mechanism provided in said housing for preventing insertion of a modular plug having a number of poles that is not a predetermined number, said foolproof mechanism comprising:

a pair of spring members each having an elongated spring section provided in said groove, a fixing section provided at a rear end thereof and secured to said housing so that said elongated spring section is outwardly flexible, and an abutment section provided at a front end thereof, said abutment section having:

a cam portion extending first inwardly and then diagonally outwardly from said front end, forming an inclined face and a stopper portion extending inwardly directly from said front end and located behind and inside said cam portion such that when a modular plug having said predetermined number of poles is inserted into said modular jack, a front end of said modular plug abuts on said inclined face of said cam portion to move said abutment section outwardly, permitting insertion of said modular plug into said modular jack but when another modular plug having a number of poles that is smaller than said predetermined number is inserted, a front end of said another modular plug abuts against said stopper portion to prevent insertion of said another modular plug.

7. The modular jack according to claim 6, wherein said spring member and said abutment section are made as a unit.

8. The modular jack according to claim 6, wherein said spring members are provided along an outside of said housing.

9. The modular jack according to claim 7, wherein said spring membes are provided along an outside of said housing.

10. The modular jack according to claim 6, which further comprises a pair of slots provided in said housing into which said abutment sections are fitted for sliding movement along rear faces of said slots.

11. The modular jack according to claim 6, which further comprises a shield plate over said housing from which said foolproof mechanism extends.

12. The modular jack according to claim 7, which further comprises a pair of slots provided in said housing into which said abutment sections are fitted for sliding movement along rear faces of said slots.

13. The modular jack according to claim 7, which further comprises a shield plate over said housing from which said foolproof mechanism extends.

* * * * *